(12) United States Patent
Chen

(10) Patent No.: US 6,339,860 B1
(45) Date of Patent: Jan. 22, 2002

(54) GLASSES WIPER STRUCTURE

(76) Inventor: Chung-Yang M. Chen, 3F, No. 2, Lane 497, Chung-Cheng Rd., Hsintien City, Taipei County (TW)

( * ) Notice: Subject to any disclaimer, the term of this patent is extended or adjusted under 35 U.S.C. 154(b) by 0 days.

(21) Appl. No.: 09/588,717

(22) Filed: Jun. 7, 2000

(51) Int. Cl.[7] .............................................. G02C 13/00
(52) U.S. Cl. ........................................ 15/214; 15/220.3
(58) Field of Search ................................ 15/214, 220.3; 401/10

(56) References Cited

U.S. PATENT DOCUMENTS

| | | | | |
|---|---|---|---|---|
| 654,486 A | * | 7/1900 | Pederson | 15/214 |
| 1,003,761 A | * | 9/1911 | Lehman | 15/214 |
| 2,055,314 A | * | 9/1936 | Seburger | 15/214 X |
| 5,457,842 A | * | 10/1995 | Chang | 15/214 |

FOREIGN PATENT DOCUMENTS

| | | | |
|---|---|---|---|
| DE | 3412558 | * | 10/1985 |
| GB | 806980 | * | 1/1959 |

* cited by examiner

*Primary Examiner*—Mark Spisich
(74) *Attorney, Agent, or Firm*—Bacon & Thomas, PLLC

(57) ABSTRACT

Glasses wiper structure including a clamp body, two wiping units and two fixing members. The clamp body has two clamping arms on two sides. A free end of each of the clamping arms is formed with a recess having a perforation at a certain position. The recess has a shape identical to that of the fixing member. A projecting post of the fixing member is passed from outer side to inner side of the clamping arm through the perforation thereof. A free end of the projecting post is formed with oblique engaging ribs. Each wiping unit from outer side to inner side includes a fabric material, a soft pad, a case seat and a fixing seat which are stacked together. The case seat is placed on bottom side of the soft pad and the fabric material wraps the soft pad and the case seat. The excessive peripheral fabric material is collected between the case seat and the fixing seat. The fixing seat and the case seat are respectively formed with a through hole and a blind hole corresponding to the perforation of the clamping arm. The oblique engaging ribs of the projecting post of the fixing member are passed through the perforation of the clamping arm and the through hole of the fixing seat to engage into the blind hole of the case seat so as to firmly associate the wiping unit with the clamping arm.

4 Claims, 3 Drawing Sheets

GLASSES WIPER STRUCTURE

BACKGROUND OF THE INVENTION

The present invention relates to a glasses wiper structure in which a separable fixing member is used to fix the wiping unit on the clamping arm to facilitate the installation of the wiping unit.

Conventionally, a piece of plush is used to wipe the spectacles of a pair of glasses so as to remove the dirt accumulating on the surfaces of the spectacles. Such plush is often placed in a glasses box. In the case that the glasses box is not carried with a user, it will be quite inconvenient for the user to solely carry the wiping plush. Moreover, the plush tends to be contaminated and miss. To solve the above problems, a portable glasses wiper has been developed. The glasses wiper includes a V-shaped clamping arm. Each free end of the clamging arm is disposed with a round head section having an engaging tenon at the center. Two sides of the engaging tenon are disposed with engaging projections and a longitudinal resilient space. The glasses wiper further includes two wiping members engaged in the engaging tenon. Each wiping member is composed of a case seat, a soft pad (such as sponge), a wiping cloth and a fixing plate. The case seat is disc-like. The soft pad is adhered to an upper close end of the case seat. The wiping cloth wraps the soft pad and the peripheral wiping cloth is collected and received in a receiving space of the bottom of the case seat. The fixing plate is positioned in the receiving space. The fixing plate is formed with a central slot. In use of such glasses wiper, the spectacle of the glasses is positioned between the two wiping members and wiped by the wiping cloth. The above portable glasses wiper is able to wipe and clean the spectacles. However, the clamping arm of such glasses wiper is V-shaped so that after one of the wiping members is installed on the clamping arm, it is necessary to outward expand the clamping arm and shorten the length of the engaging tenon to a certain extent so as to enlarge the space for the fixing plate to pass over the height of the tenon and insert the tenon into the slot of the fixing plate. When expanding the clamping arm, the interconnecting section of the clamping arm tends to deform or damage due to concentration of stress. In the case that the tenon is designed with shorter length, the installation will be unreliable and the wiping members may detach during wiping.

SUMMARY OF THE INVENTION

It is therefore a primary object of the present invention to provide a glasses wiper structure including a clamp body, two wiping units and two fixing members. The clamp body has two clamping arms on two sides. A free end of each of the clamping arms is formed with a perforation for a projecting post of the fixing member to pass from outer side to inner side of the clamping arm through the perforation thereof. A free end of the projecting post is formed with oblique engaging ribs. Each wiping unit from outer side to inner side includes a fabric material, a soft pad, a case seat and a fixing seat which are stacked together. The case seat is placed on bottom side of the soft pad and the fabric material wraps the soft pad and the case seat. The excessive peripheral fabric material is collected between the case seat and the fixing seat. The fixing seat and the case seat are respectively formed with a through hole and a blind hole corresponding to the perforation of the clamping arm. The oblique engaging ribs of the projecting post of the fixing member are passed through the perforation of the clamping arm and the through hole of the fixing seat to engage into the blind hole of the case seat so as to firmly associate the wiping unit with the clamping arm.

The present invention can be best understood through the following description and accompanying drawings wherein:

DETAILED DESCRIPTION OF THE PREFERRED EMBODIMENT

Figure 1:
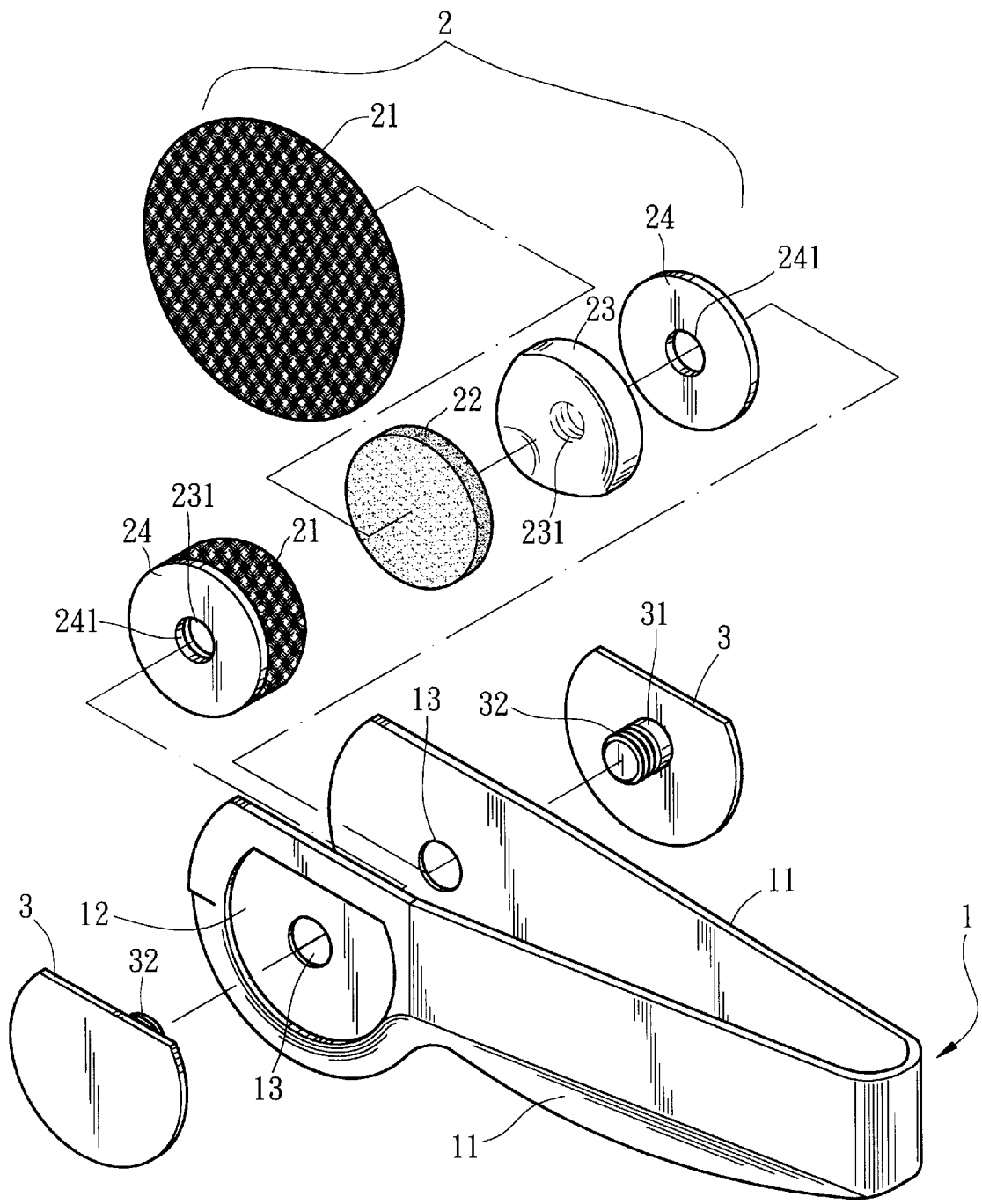
FIG. 1 is a perspective exploded view of the present invention.
Figure 2:
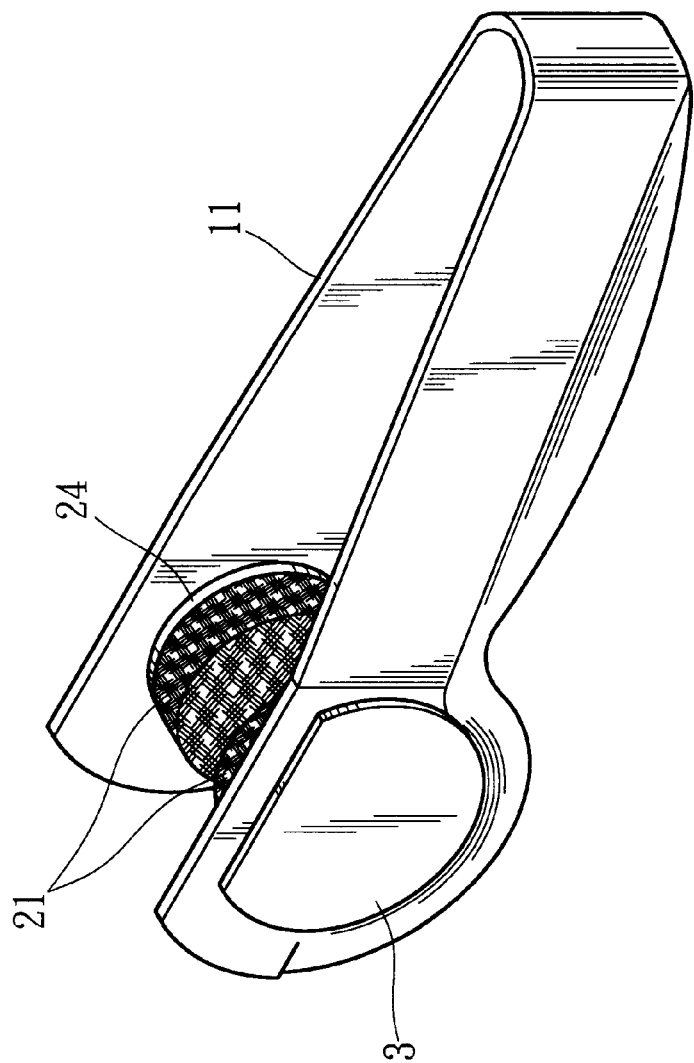
FIG. 2 is a perspective assembled view of the present invention.
Figure 3:
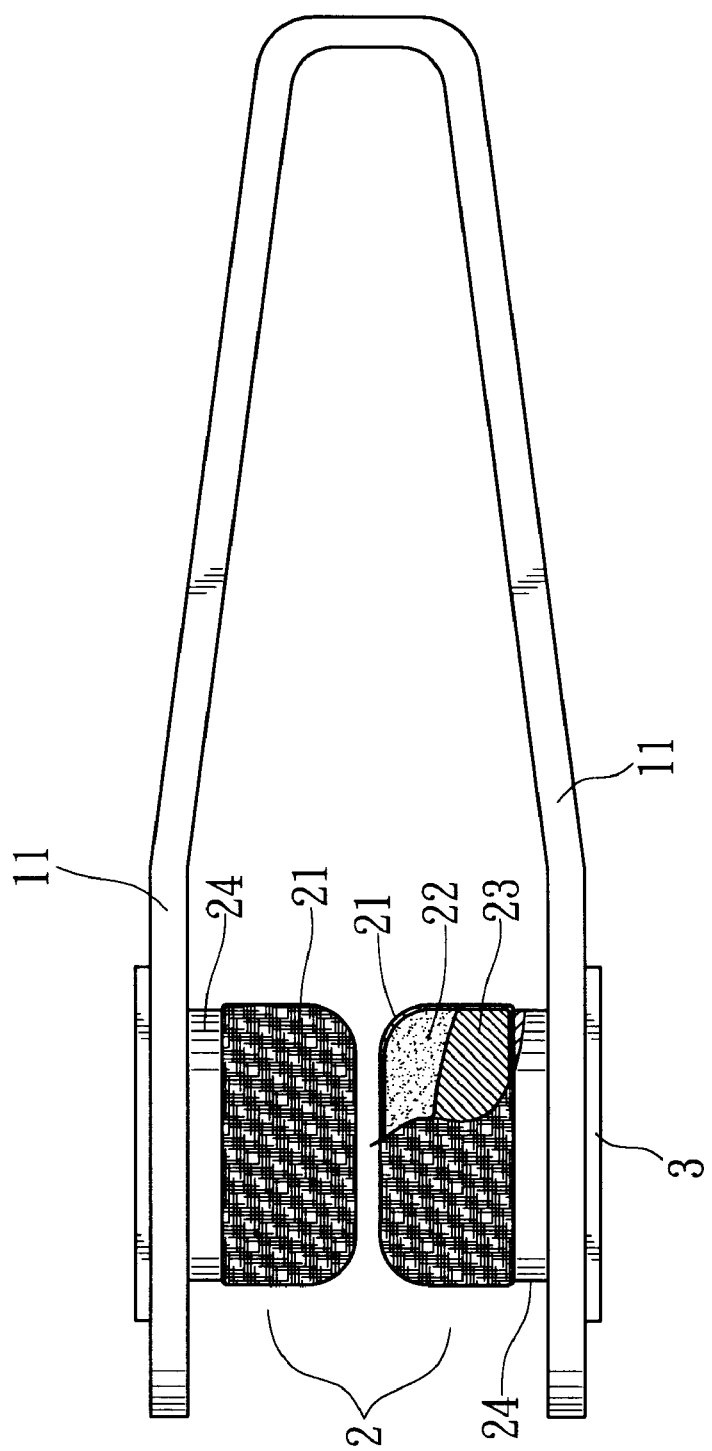
FIG. 3 is a plane assembled view of the present invention.

Please refer to FIGS. 1 and 2. The present invention includes a clamp body 1, two wiping units 2 and two fixing members 3. The clamp body 1 has two clamping arms 11 containing therebetween a certain angle. A free end of each clamping arm 11 is formed with a recess 12 having a perforation 13 at a certain position. The wiping unit 2 includes a fabric material 21, a soft pad 22, a case seat 23 and a fixing seat 24. The fabric material 21 is made of soft material (such as plush) capable of achieving a cleaning effect without harming the spectacle. The case seat 23 has a front concave face. The back face thereof is formed with a central blind hole 231. The fixing seat 24 is substantially panel-like and formed with a central through hole. One side of the fixing member 3 is disposed with a projecting post 31 formed with oblique engaging ribs 32. When assembled, the case seat 23 is placed on bottom side of the soft pad 22. The fabric material 21 wraps the soft pad 22 and the case seat 23. The excessive peripheral fabric material 21 is collected between the case seat 23 and the fixing seat 24. The projecting post 31 of the fixing member 3 is passed through the perforations 13 of the clamping arms 11 and the oblique engaging ribs 32 are fitted through the through hole 241 of the fixing seat 24 to engage with and locate in the blind hole 231 of the case seat 23.

When installing the wiping unit 2, the assembled wiping unit 2 is first extended between the clamping arms 11 and then the projecting post 31 of the fixing member 3 is inward passed from outer side of the clamping arms 11 through the perforation 13 of the clamping arms 11 and the through hole 241 of the fixing seat 24 into the blind hole 231 of the case seat 23, Therefore, the wiping unit 2 is engaged and fixed without outward expanding the clamping arms 11 for accommodating the wiping unit 2 and the projecting post 31. Therefore, the inconvenience and trouble existing in the installation of the wiping member of the conventional glasses wiper structure are avoided. Also, the reverse turning section of the two clamping arms is protected from resilient failure or concentration of stress during the expanding procedure.

In addition, in order for the fabric material 21 to more firmly wrap the soft pad 22 and the case seat 23, the inner face of the fabric material 21 is painted with an adhesive for adhering the soft pad 22 and the case seat 23 with the fabric material 21 and achieving a more reliable connecting effect.

The above embodiment is only used to illustrate the present invention, not intended to limit the scope thereof. Many modifications of the above embodiment can be made without departing from the spirit of the present invention.

What is claimed is:

1. Glasses wiper structure comprising a clamp body, two wiping units and two fixing members, the clamp body having two clamping arms containing therebetween a certain angle, a free end of each clamping arm being formed with a perforation, each wiping unit including a fabric material, a soft pad, a case seat and a fixing seat, the case seat being placed on a bottom side of the soft pad, the fabric material wrapping the soft pad and the case seat, the excessive peripheral fabric material being collected between the case seat and the fixing seat, the fixing seat and the case seat being respectively formed with a through hole and a blind hole corresponding to the perforation of the clamping arm, one side of each fixing member being disposed with a projecting post, the projecting post of each fixing member being passed from an outer side to an inner side of the clamping arms through the perforation of the respective clamping arm and the through hole of the fixing seat into the blind hole of the case seat, whereby the wiping units are easily engaged with and fixed at two ends of the clamping arms without outward expanding the clamping arms to enlarge the gap therebetween.

2. Glasses wiper structure as claimed in claim 1, wherein a free end of the projecting post is formed with oblique engaging ribs for engaging in the blind hole of the case seat.

3. Glasses wiper structure as claimed in claim 1, wherein an inner face of the fabric material is painted with an adhesive, whereby when wrapping the soft pad and the case seat, the fabric material is able to more firmly connect therewith.

4. Glasses wiper structure as claimed in claim 1, wherein an outer side of a free end of each clamping arm is formed with a recess having a shape identical to that of the fixing member for the fixing member to inlay and locate therein.

* * * * *

UNITED STATES PATENT AND TRADEMARK OFFICE
CERTIFICATE OF CORRECTION

PATENT NO.   : 6,339,860 B1
DATED        : January 22, 2003
INVENTOR(S)  : Chen

It is certified that error appears in the above-identified patent and that said Letters Patent is hereby corrected as shown below:

<u>Title page,</u>
Item [*] Notice, delete "by 0 days" and insert -- by 48 days --

Signed and Sealed this

Eleventh Day of May, 2004

JON W. DUDAS
*Acting Director of the United States Patent and Trademark Office*